United States Patent [19]

Lehse

[11] Patent Number: 5,669,832
[45] Date of Patent: Sep. 23, 1997

[54] INCLINATION INDICATING APPARATUS AND METHOD FOR USING THE SAME

[76] Inventor: David J. Lehse, 4871 Heather Ridge Rd., Oakdale, Minn. 55128

[21] Appl. No.: 582,369

[22] Filed: Jan. 11, 1996

[51] Int. Cl.⁶ .................................................. A63B 57/00
[52] U.S. Cl. ........................................ 473/404; 33/374
[58] Field of Search .......................... 473/404, 131, 473/407, 219; 33/508, 365, 368, 374, 377, 379, 384

[56] References Cited

U.S. PATENT DOCUMENTS

| | | |
|---|---|---|
| 161,155 | 3/1875 | Ransom . |
| 2,306,373 | 12/1942 | Belden ................................. 33/206 |
| 2,752,692 | 7/1956 | Smith .................................. 33/374 |
| 3,492,739 | 2/1970 | Boyle, Jr. ............................ 33/207 |
| 3,751,819 | 8/1973 | Dixon .................................. 33/389 |
| 3,870,299 | 3/1975 | Howe . |
| 4,302,962 | 12/1981 | Williams ............................. 73/1 E |
| 4,824,114 | 4/1989 | Catalano . |
| 4,848,003 | 7/1989 | Westphal et al. ................... 33/384 |
| 4,984,791 | 1/1991 | Labell . |
| 5,025,568 | 6/1991 | Grimes ................................ 33/384 |
| 5,209,470 | 5/1993 | Cimaroli et al. . |
| 5,326,096 | 7/1994 | H'Doubler . |
| 5,330,179 | 7/1994 | Hampel . |
| 5,431,391 | 7/1995 | Tracey ............................... 473/404 |
| 5,476,258 | 12/1995 | Frisone ............................. 473/404 |

*Primary Examiner*—Steven B. Wong
*Attorney, Agent, or Firm*—Mueting, Raasch Gebhardt & Schwappach, P.A.

[57] ABSTRACT

An inclination indicating apparatus having a housing with a base defining a first plane. A plurality of support legs support the base of the housing above the surface in an operational configuration. At least one of the support legs is rotatable so that a bottom portion of the at least one support leg traverses a second plane parallel to the first plane from the operational configuration to a storage configuration. A circular float level mounted on the housing having a bubble indicator provides an indication the slope of the first plane relative to the surface.

24 Claims, 13 Drawing Sheets

INCLINATION INDICATING APPARATUS AND METHOD FOR USING THE SAME

FIELD OF THE INVENTION

The present invention is directed to an inclination indicating apparatus for indicating the slope of a surface and a method for using the same, and more particularly, to a support structure for raising the float level above the surface whose inclination is being indicated.

BACKGROUND OF THE INVENTION

The surfaces of golf greens are contoured to present a variety of angles and slopes of varying degrees to golfers. In order to putt effectively, the golfer must determine the distance the golf ball will move from a straight line trajectory during its movement toward the golf cup. Failure to properly determine this distance will result in a missed putt.

By knowing the lateral and longitudinal slopes of the green between the ball and the cup, the golfer may adjust the initial direction of the ball to compensate for the contours. In order to effectively determine the amount of adjustment from a straight line path to the cup, the golfer must evaluate the contours of the green along the entire path from the location of the ball to the cup. Although such slope determinations can be made by visual sightings, this method is not always accurate, especially for new golfers.

Additionally, it is not uncommon for the cup to be located on an unlevel point on the green. Therefore, it is necessary for the golfer to determine the slope or contour of the green immediately adjacent to the cup.

SUMMARY OF THE INVENTION

The present invention is directed to an inclination indicating apparatus for indicating the slope of a surface.

The inclination indicating apparatus includes a housing having a base defining a first plane and a plurality of support legs for supporting the base of the housing above the surface in an operational configuration. The support legs are rotatable into a generally coplanar storage configuration. A multi-directional level indicator is located on the housing for indicating the slope of the first plane relative to the surface when the inclination indicating apparatus is located on the surface in the operational configuration. In one embodiment, the multi-directional level indicator is a circular float level with a bubble indicator.

In the operational position, the plurality of support legs are preferably spaced to span over the top of the cup on the golf green. Alternatively, the support legs are long enough so that the inclination indicating apparatus can be located over the top of a golf ball on the golf green.

In one embodiment, a bottom portion of at least one support leg traverses a second plane parallel to the first plane when moved between the operational configuration and a storage configuration. In an alternate embodiment, the support legs fold downward from the operational configuration to a point location in a generally non-planar storage configuration.

In one embodiment, the plurality of support legs are three angularly spaced support legs. At least two of the support legs are rotatable mounted to the housing to collapsible in a generally coplanar configuration with a third leg. The first support leg is pivotally mounted at a first pivot point on the base of the housing and the second support leg is mounted at a second pivot point on the base of the housing. In one embodiment, the first, second and third legs are spaced equally around the perimeter of the base when in the operational configuration.

The first support leg may include a first traveling member extending therefrom for traveling in a first radial slot along the base as the first support leg is pivoted between the operational configuration and the storage configuration. The second support leg includes a second traveling member that travels in a second radial slot along the base. The first and second traveling members provide angular stability to the first and second support legs.

In an alternate embodiment, the plurality of support legs are first and second support legs rotatably mounted to the housing and a third support leg rigidly mounted to the housing. The first and second support legs having an operational configuration angularly spaced from a third support leg and a storage configuration such that the first and second support legs are rotatable adjacent to the third support leg.

The circular float level includes markings thereon to indicate magnitude of the slope of the plane relative to the surface. The markings may include a plurality of concentric circles or a variety of other arrangements. The circular float level is generally a hollow chamber containing a fluid and a buoyant member that moves along the markings in response to the slope of first plane. The first plane of the base is located above the surface a distance greater than the diameter of a golf ball.

In an alternate embodiment, the inclination indicating apparatus has a housing with a base defining a first plane. A plurality of support legs support the base of the housing above the surface in an operational configuration. At least one of the support legs is rotatable so that a bottom portion of the at least one support leg traverses a second plane parallel to the first plane from the operational configuration to a storage configuration. A circular float level mounted on the housing having a bubble indicator provides an indication the slope of the first plane relative to the surface.

The method of using the present inclination indicating apparatus includes rotating at least one of the support leg from an storage configuration to a operational configuration. The inclination indicating apparatus is located on a surface. A multi-directional float level mounted on the housing is observed to determine the slope of the first plane relative to the surface. The present method further includes the step of rotating the at least one support leg from the operational configuration to the storage configuration.

BRIEF DESCRIPTION OF THE DRAWINGS

The construction designed to carry out the invention will herein be described, together with other features thereof. The invention will be more readily understood from a reading of the following specification and by reference to the accompanying drawings forming a part thereof, wherein the exemplary embodiments of the invention are shown.

DETAILED DESCRIPTION OF THE PREFERRED EMBODIMENT

Figure 1:
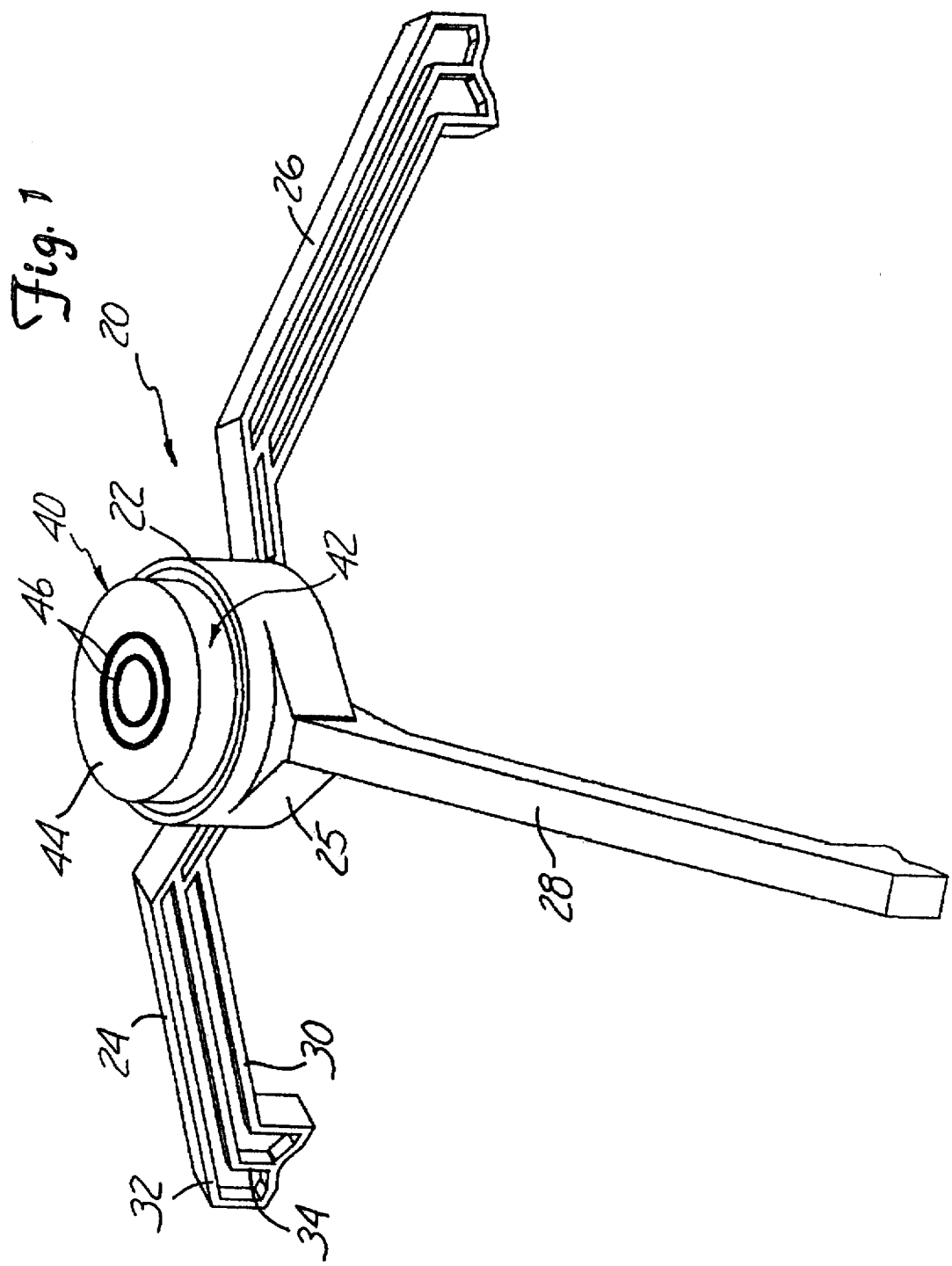
FIG. 1 is a perspective view of the exemplary inclination indicating apparatus.

FIG. 1 is a perspective view of an exemplary inclination indicating apparatus 20. A housing 22 having a base 25 is supported by first and second rotatable support legs 24, 26, and a rigidly mounted third leg 28. The first and second support legs 24, 26 include inner and outer reinforcing ribs 30, 32, and central rib 34 to provide a lightweight reinforced structure. A multi-directional float device 40 is mounted on top of the housing 22. In the preferred embodiment, the multi-directional float device 40 comprises a hollow chamber 42 containing a buoyant member such as a bubble of air. A top surface 44 of the circular float device 40 includes a plurality of concentric circles 46 for determining the direction and degree of slope of the surface (see FIG. 5).

The present inclination indicating apparatus may be constructed from a variety of materials, such as wood, plastic, metal or combinations thereof. Additionally, a variety of other level indicating devices may be substituted for the multi-directional float device 40 of FIG. 1. For example, a pair of linear bubble levels may be arranged orthogonally to provide an indication of lateral and longitudinal slope, such as is disclosed in U.S. Pat. No. 5,326,096 issued to H'Doubler on Jul. 5, 1994, which is hereby incorporated by reference. However, the circular float device 40 illustrated in FIG. 1 is preferred.

Figure 2:
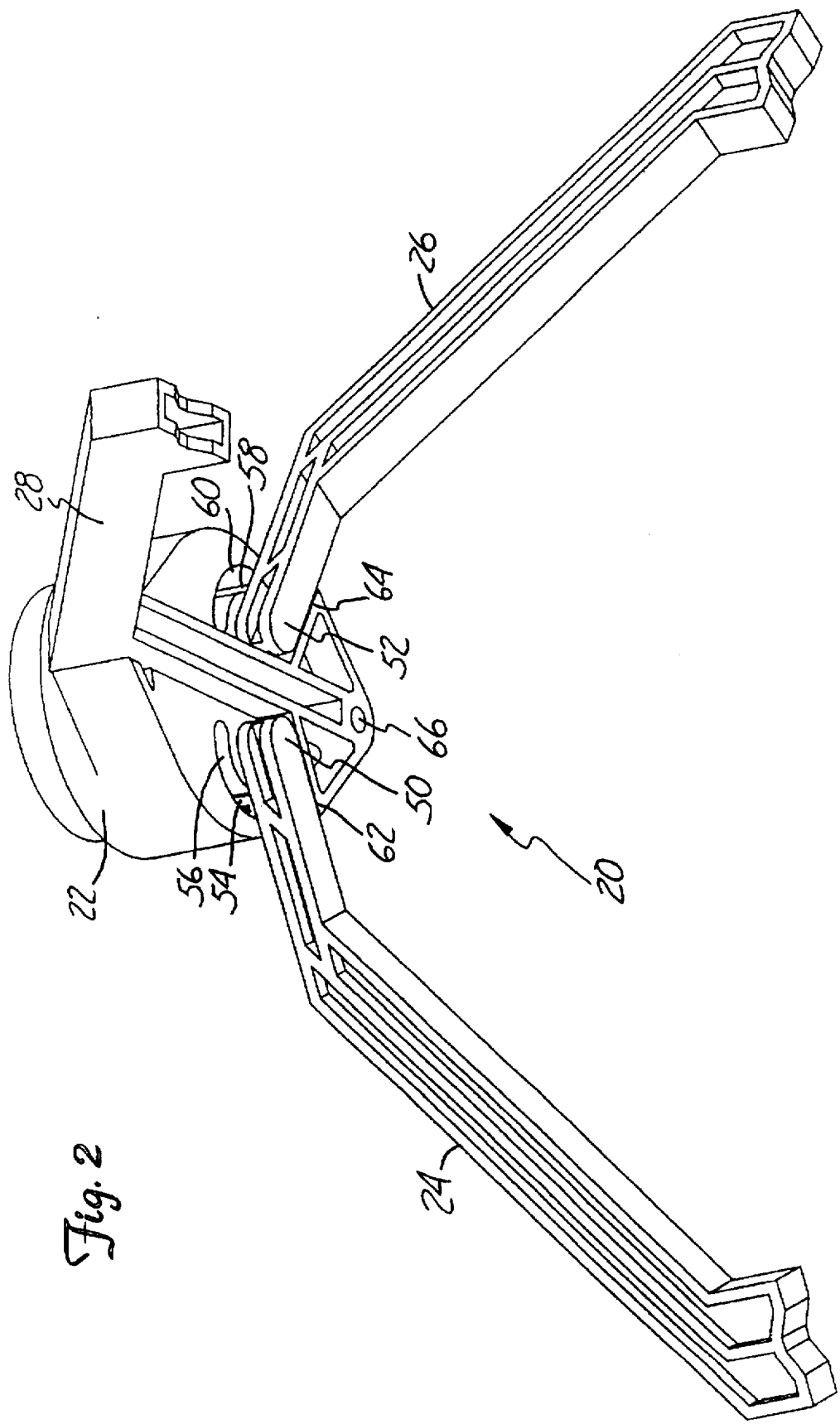
FIG. 2 is a bottom perspective view of the inclination indicating apparatus of FIG. 1.

FIG. 2 is a bottom perspective view of the inclination indicating apparatus 20 of FIG. 1. The first and second support legs 24, 26 are pivotally mounted to the housing 22 at first pivot point 50 and second pivot point 52, respectively. The first support leg 24 includes a first traveling member 54, that is arranged to engage a first radial slot 56. The second support leg 26 includes a second traveling member 58, that is positioned to engage a second radial slot 60. The third support leg 28 is preferably integrally formed with the housing 22.

In the operational configuration illustrated in FIG. 2, the first support leg is moved distally from the third support leg 28 until it encounters end stop surface 62. Similarly, the second support leg 26 is moved distally from the third support leg 28 until it encounters end stop surface 64. A mounting hole 66 is provided for attaching the inclination indicating apparatus 20 to a hook or other storage means.

Figure 3:
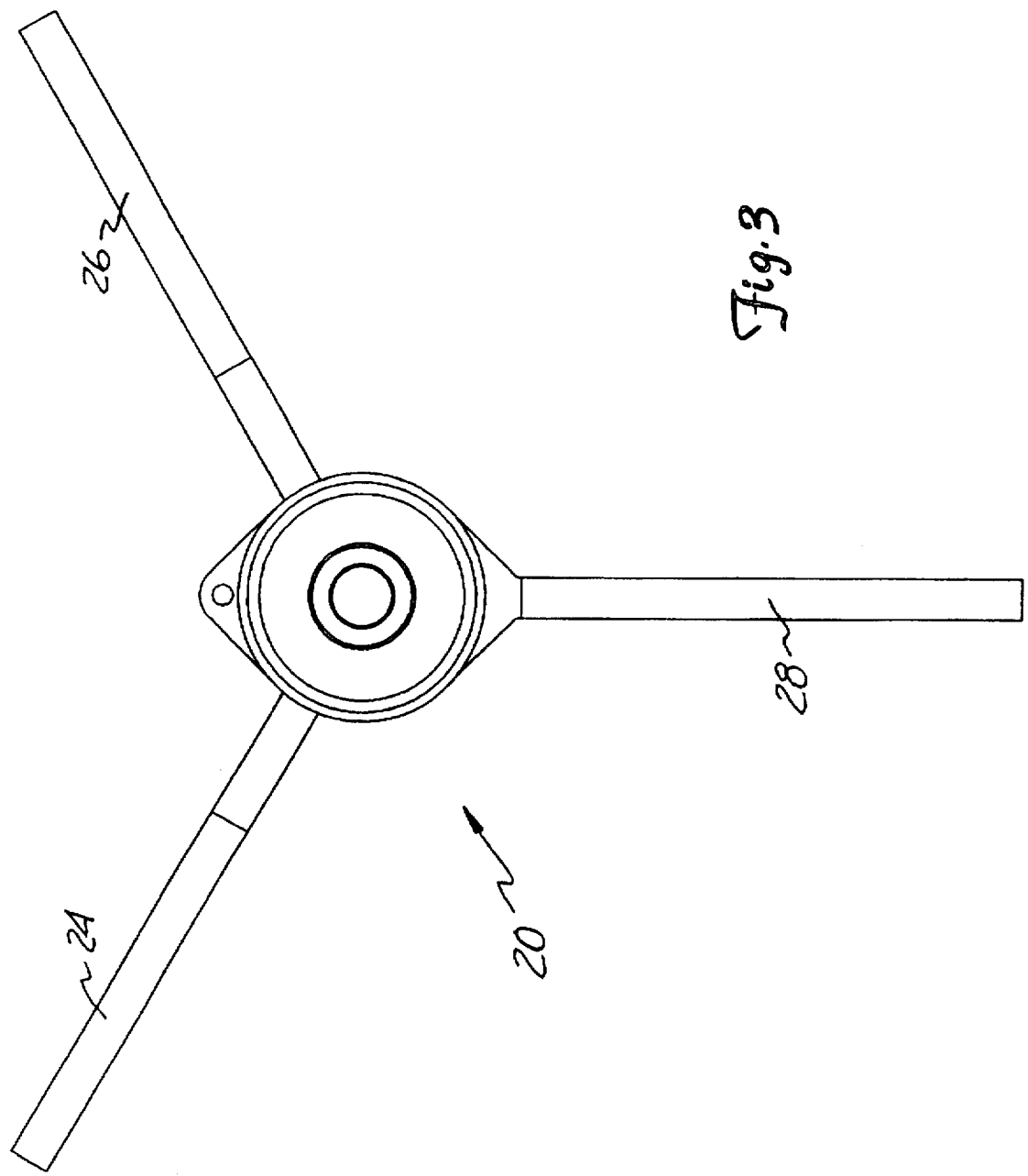
FIG. 3 is a top view of the inclination indicating apparatus of FIG. 1.

FIG. 3 is a top plan view of the inclination indicating apparatus 20 of FIG. 1. In the embodiment illustrated in FIG. 3, the support legs 24, 26, 28 are spaced equidistant from one another at 120° intervals. However, it will be understood that the precise spacing of the legs is not critical to the operation of the present invention. Additionally, it will be understood that the number of support legs may vary. For example, more than three legs may be used. Additionally, two legs may be used if the base of the legs have a surface area sufficient to balance the inclination indicating apparatus.

Figure 4:
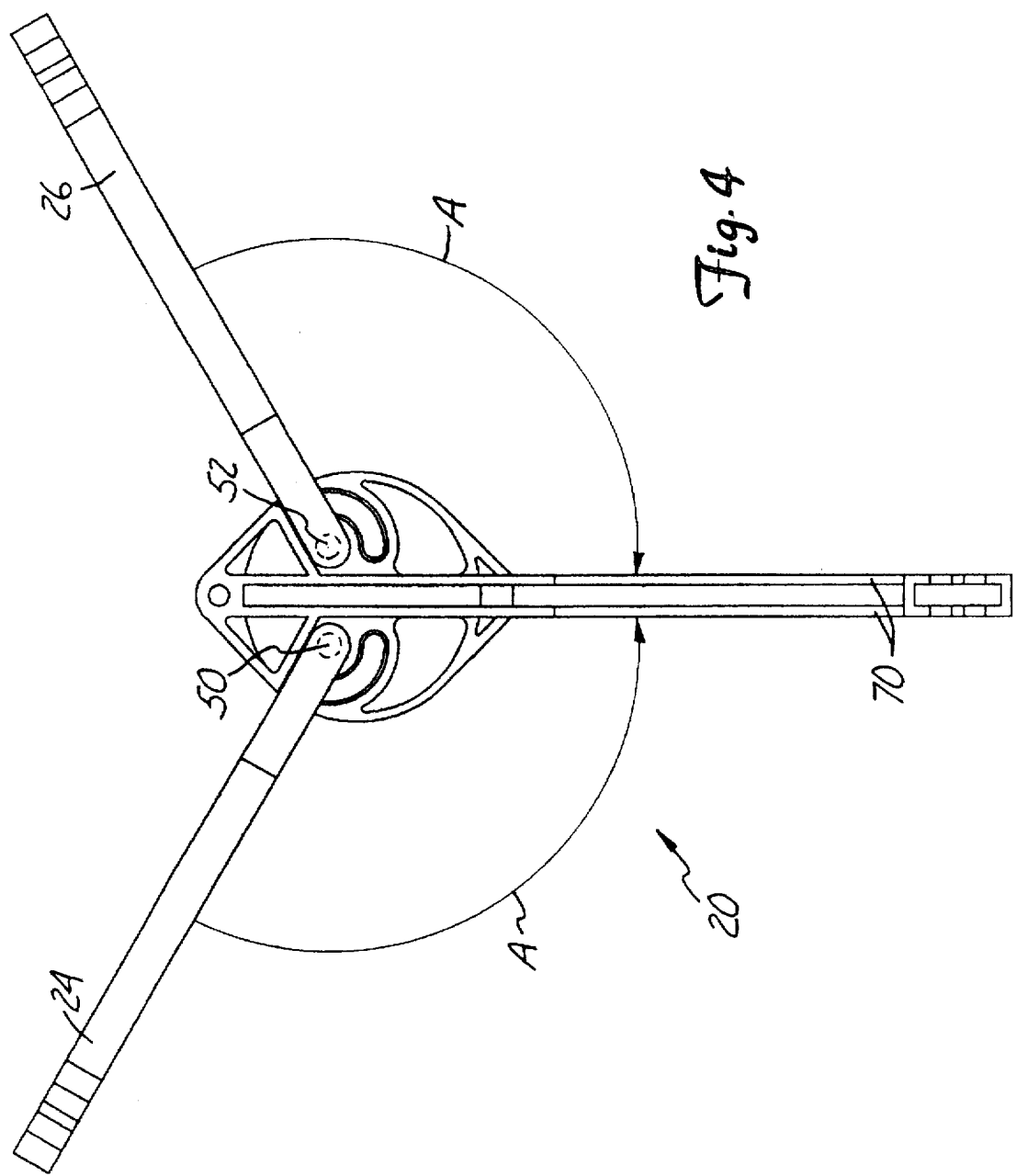
FIG. 4 is a bottom plan view of the inclination indicating apparatus of FIG. 1.

FIG. 4 is a bottom plan view of the inclination indicating apparatus 20 of FIG. 1. The third support leg 28 includes a pair of opposing reinforcing ribs 70 to provide additional structural strength. The first and second support legs 24, 26 can be rotated around a pivot point 50, 52 along the arcs "A" until they are coplanar with the third support leg 28. This storage configuration is convenient for carrying the inclination indicating apparatus in a pocket or golf bag.

Figure 5:
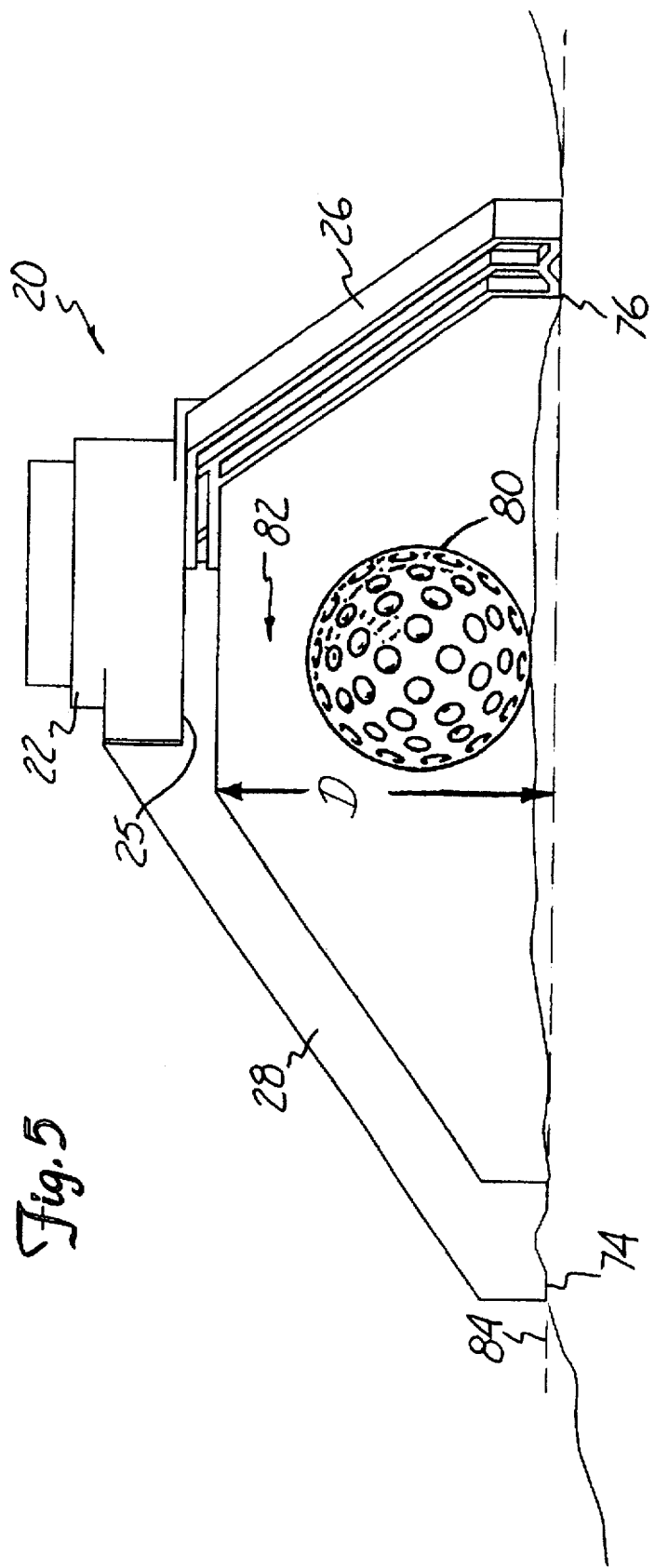
FIG. 5 is a right side view of the inclination indicating apparatus of FIG. 1.

FIG. 5 is a side view of the inclination indicating apparatus 20 of FIG. 1. The support legs 24, 26, 28 retain the housing 22 above the surface 72 approximately a distance "D." It will be understood that the distance "D" corresponds to a distance from a plane 84 defined by the bases 70 (see FIGS. 7 and 8), 74, 76 of each of the support legs 24 (see FIG. 6), 26, 28 to the base 25 of the housing 22. Preferably, the distance "D" is greater than the average diameter of a golf ball 80, so that a gap 82 is formed between the base 25 and the top edge of the golf ball 80. The inclination indicating apparatus 20 can be located over the top of the golf ball 80 to determine the slope of the green immediately adjacent to the golf ball 80.

Figure 6:
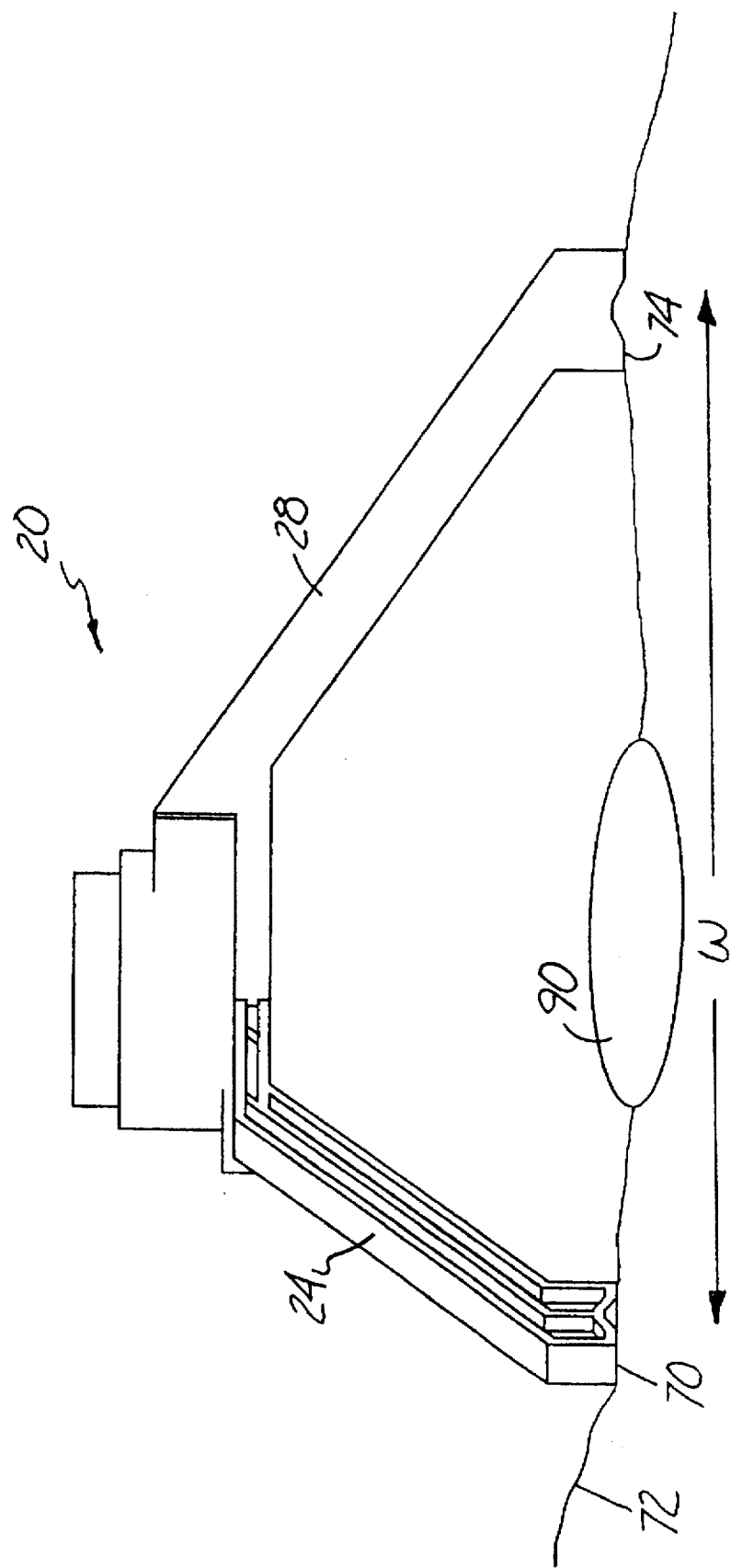
FIG. 6 is a left side view of the inclination indicating apparatus of FIG. 1.

FIG. 6 is a left plan view of the inclination indicating apparatus 20 of FIG. 1 positioned over a golf cup 90 in the surface 72. The bases 70, 74 of the legs 24, 28 are separated by a distance "W" so that the inclination indicating apparatus 20 can be located over the cup 90 to provide an indication of the slope adjacent to the cup 90.

Figure 7:
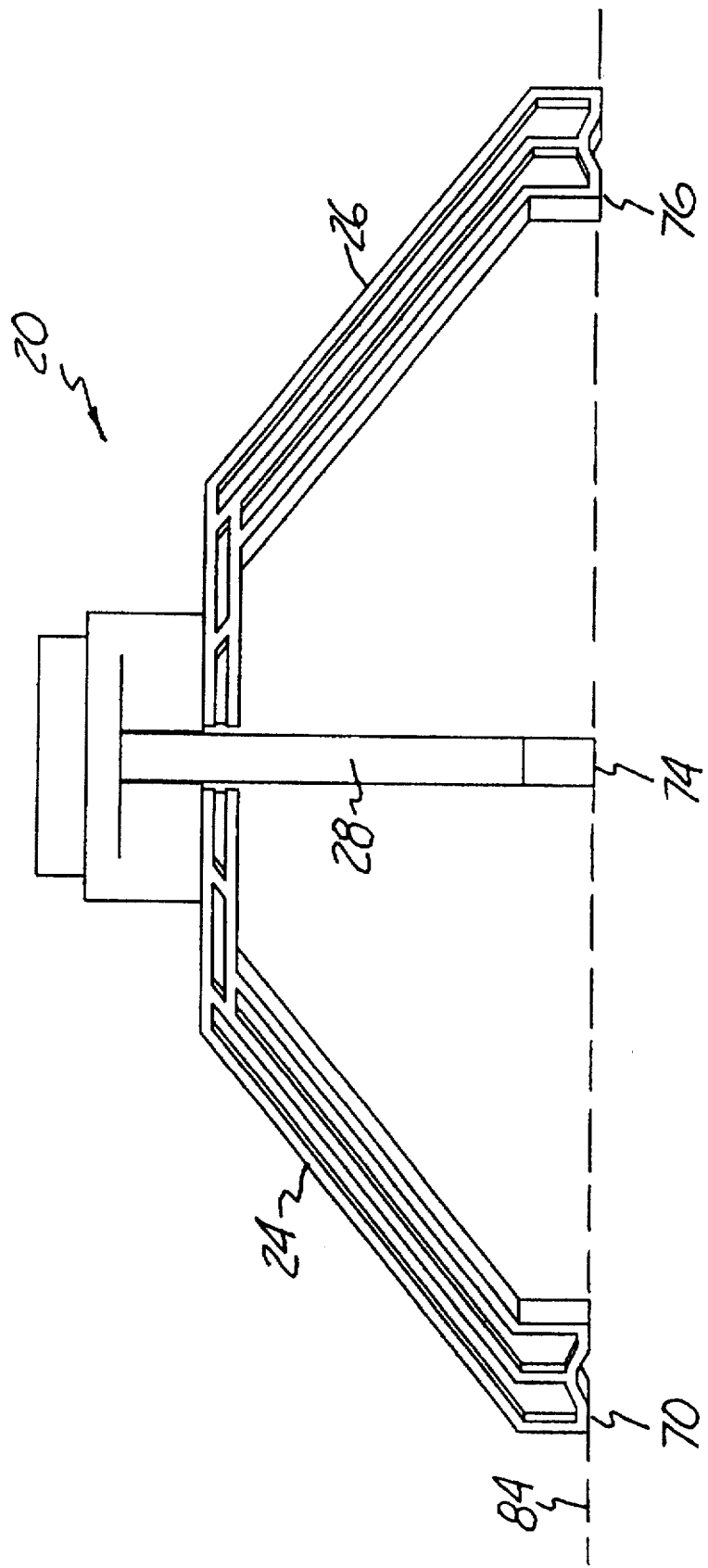
FIG. 7 is a from view of the inclination indicating apparatus of FIG. 1.
Figure 8:
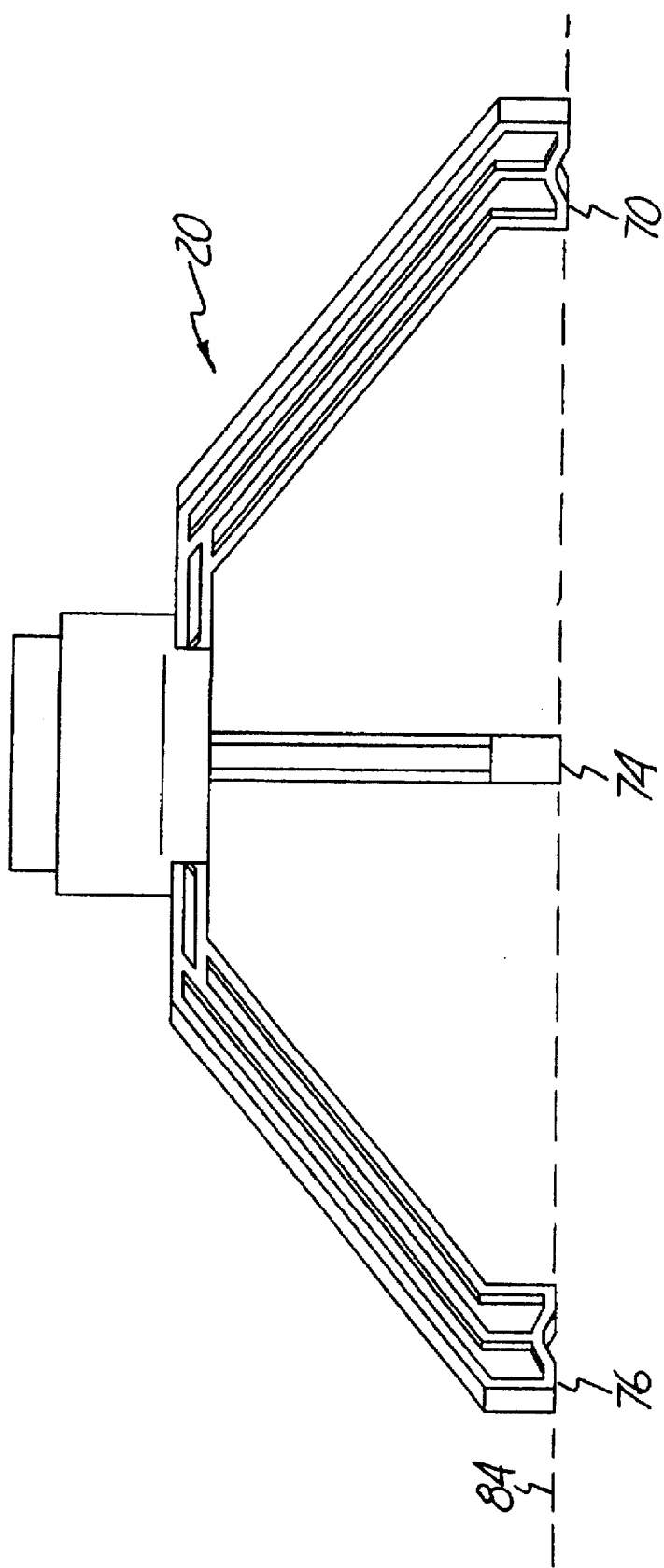
FIG. 8 is a rear view of the inclination indicating apparatus of FIG. 1.

FIGS. 7 and 8 illustrate front and rear views, respectively, of the inclination indicating apparatus 20 of FIG. 1. In a preferred embodiment, the bases 70, 76 of the first and second support legs 24, 26, respectively, traverse the second plane 84 parallel when moved from the operational position to the storage position as illustrated in FIG. 4. This arrangement ensures that the distance "D" between the second plane 84 and the base 25 remains constant at all times, even if the first and second support legs 24, 26 are not fully extended to the operational position.

Figure 9:
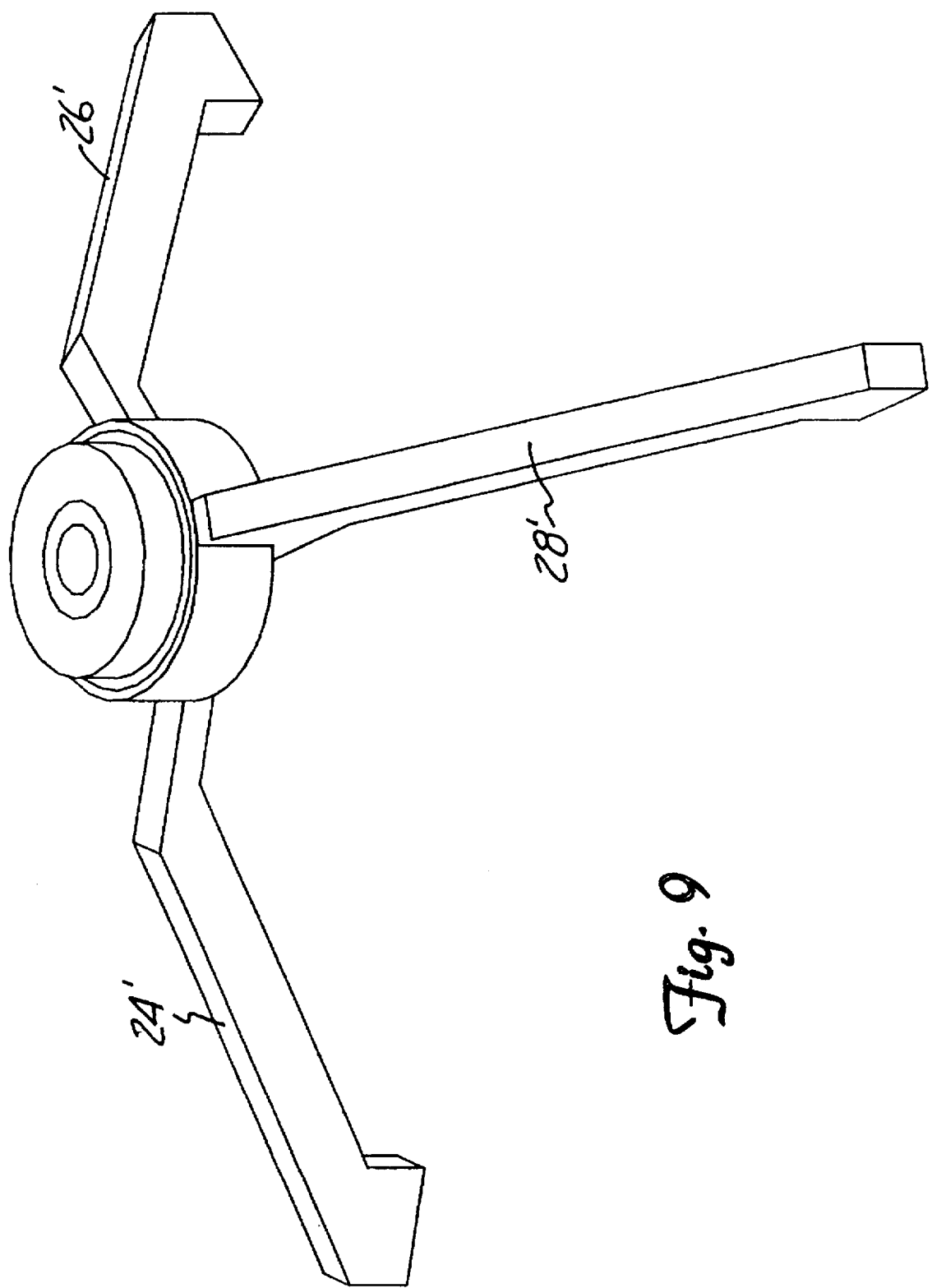
FIG. 9 is a perspective view of an alternate inclination indicating apparatus.
Figure 10:
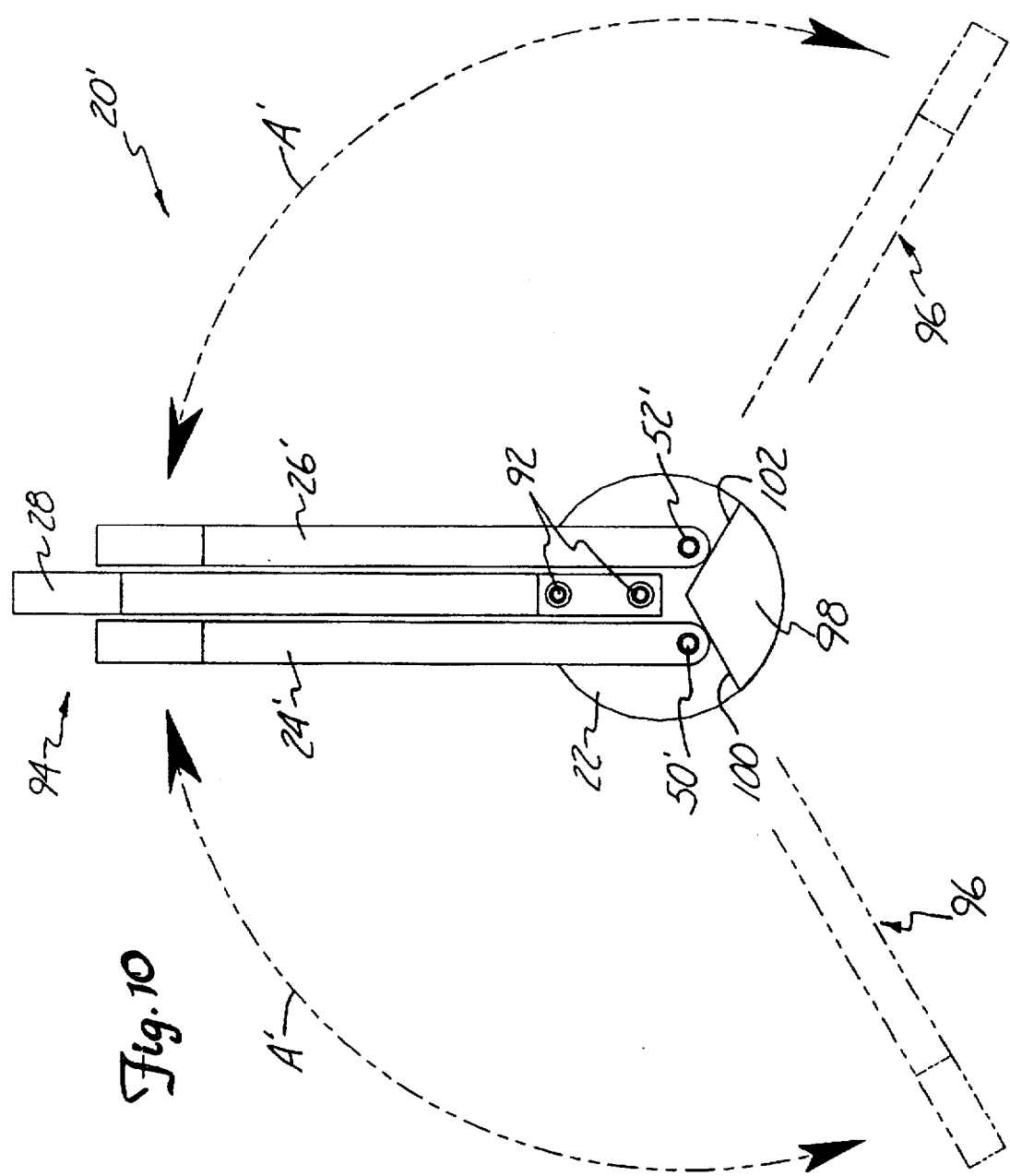
FIG. 10 is a bottom view of the inclination indicating apparatus of FIG. 9 showing the support legs in an operational and a storage configuration.

FIGS. 9 and 10 illustrate an alternate embodiment of the present inclination indicating apparatus 20' showing a perspective view. As illustrated in FIG. 10, the first and second legs, 24', 26' are attached to the housing 22' at first and second pivot points 50', 52'. The third leg 28' is attached to the base by a pair of fasteners 92. FIG. 10 illustrates the legs 24', 26', 28' in a storage configuration 94. The legs 24' and 26' may be rotated along the arc A' to an operational configuration 96. A raised triangular stop 98 provides a pair of surfaces 100, 102 that serve as end stops.

Figure 11:
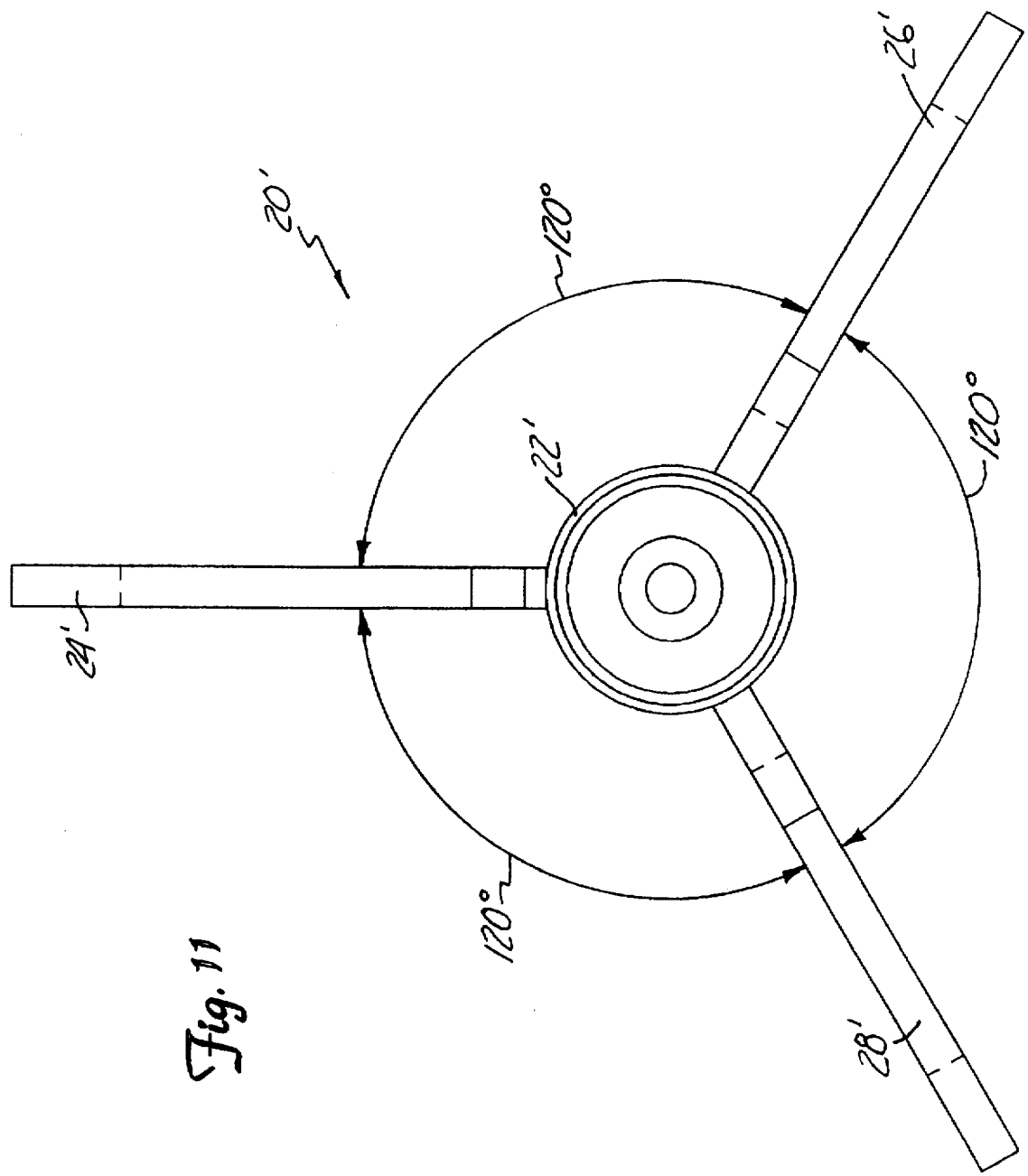
FIG. 11 is a top view of the inclination indicating apparatus of FIG. 9 showing the support legs spaced equidistant.
Figure 12:
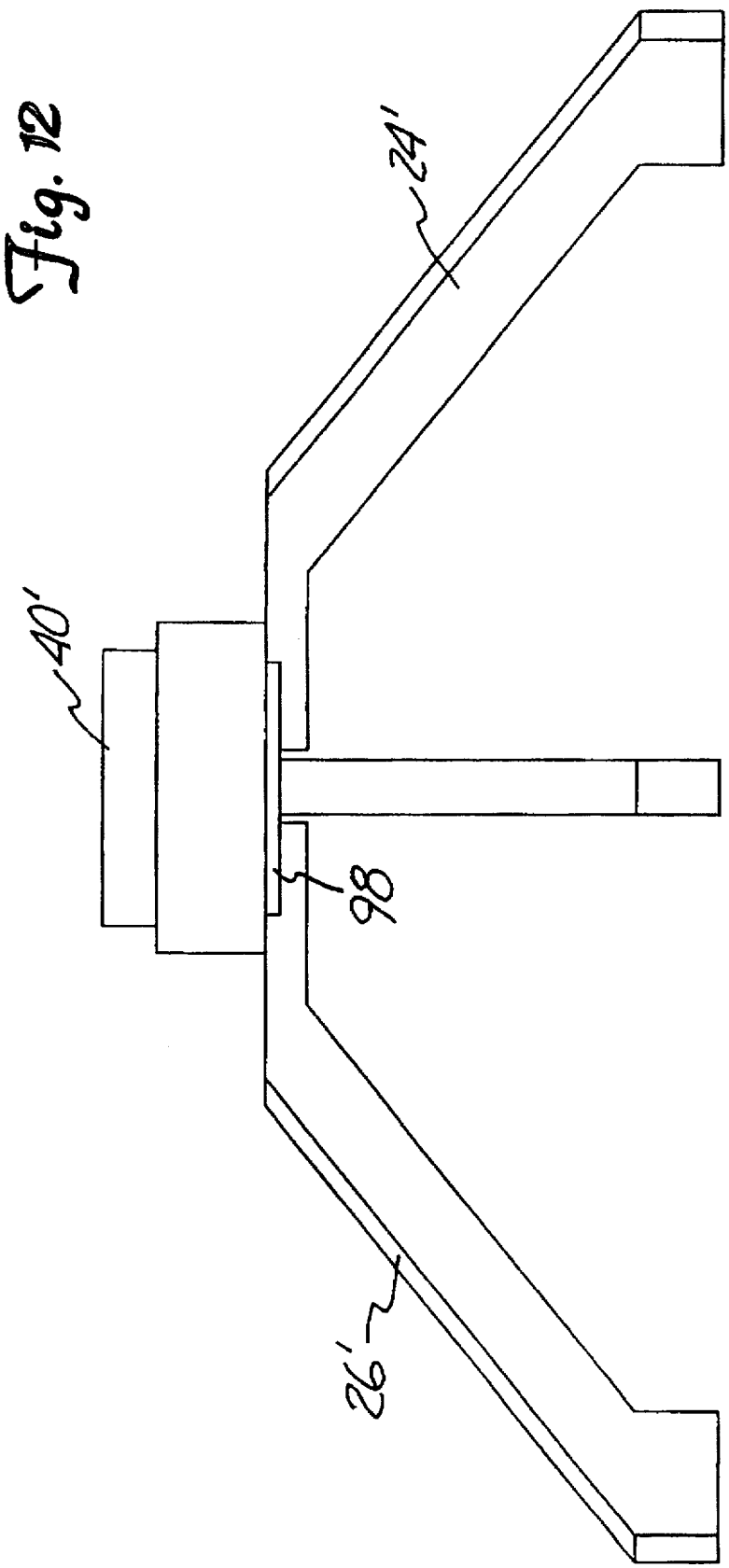
FIG. 12 is a rear view of the inclination indicating apparatus of FIG. 9.

FIG. 11 is a top plan view of the inclination indicating apparatus 20' of FIG. 9 showing the support legs 24', 26', and 28' equally spaced at 120° intervals around the housing 22'. FIG. 12 is a rear plan view of the inclination indicating apparatus 20' of FIG. 9 showing the first and second support legs 24', 26' in an operational configuration abutting the raised triangular end stop 98. The circular float device 40' is preferably a circular float device with a bubble indicator such as is illustrated in FIG. 1.

Figure 13:
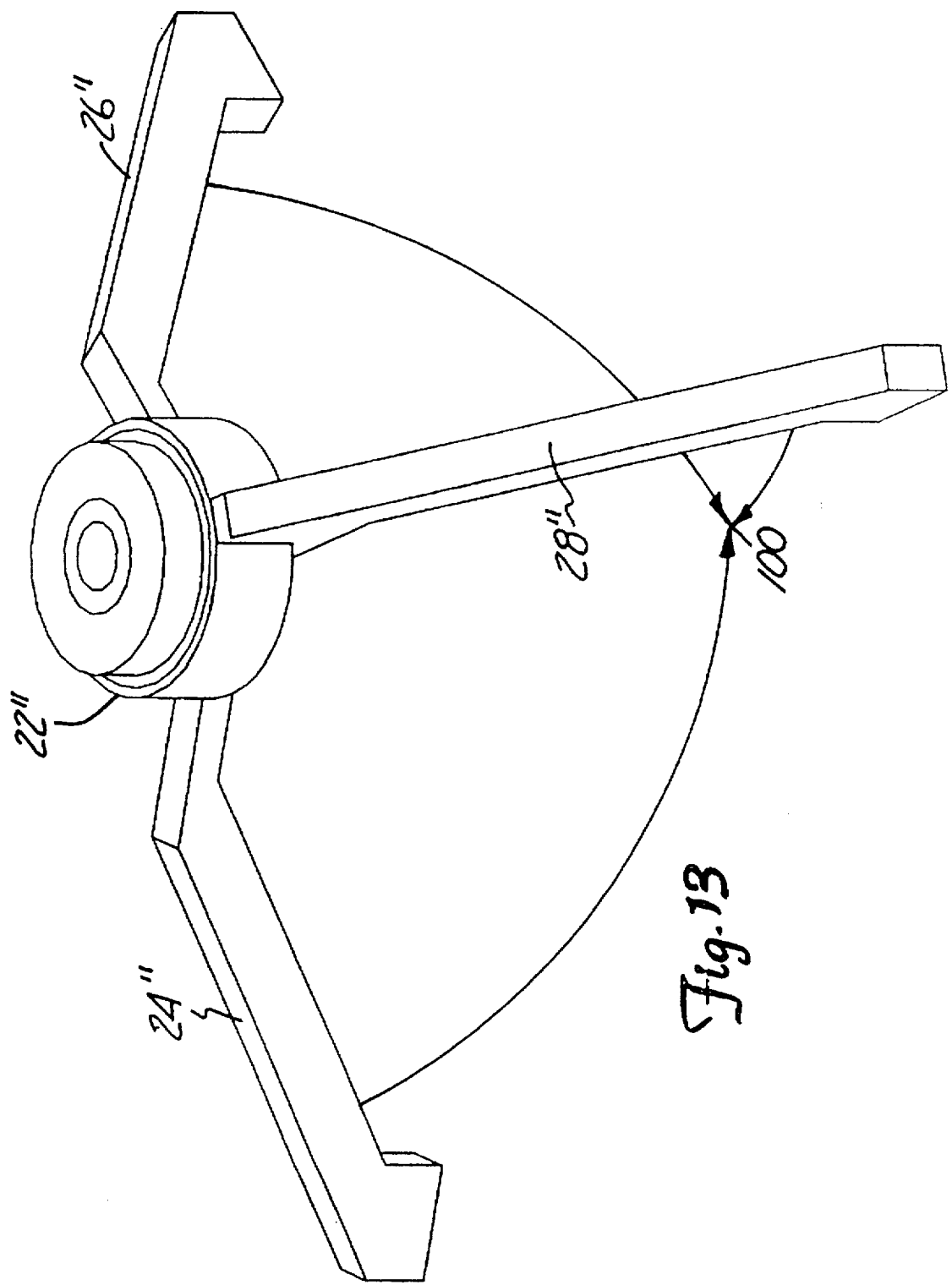
FIG. 13 is a perspective view of an alternate inclination indicating apparatus in which the support legs fold downward.

FIG. 13 illustrates an alternate embodiment in which the support legs 24", 26", 28" are hinged to fold downward from the operational configuration to an intersection point 100 below the housing 22" in the storage configuration. In the embodiment of FIG. 13, the legs 24", 26" and 28" are generally not coplanar in the storage configuration.

The present invention has now been described with reference to the several embodiments thereof. It will be apparent to those skilled in the art that many changes can be made in the embodiments described without departing from the scope of the invention. Thus, the scope of the present invention should not be limited to the structures described herein, but only by structures described by the language of the claims and the equivalents of those structures. For example, the present portable traction device may be arranged in a variety of configurations to facilitate traction to any part of the body.

What is claimed is:

1. An inclination indicating apparatus for indicating the slope of a surface, the inclination indicating apparatus comprising:

a housing having a base defining a first plane;

a plurality of support legs for supporting the base of the housing above the surface in an operational configuration so that the first plane of the base is capable of being located above the surface by a fixed distance, at least one of the support legs being rotatable to form a generally coplanar storage configuration; and a multi-directional level indicator on the housing for indicating the slope of the first plane relative to the surface when the inclination indicating apparatus is located on the surface in the operational configuration.

2. The apparatus of claim 1 wherein a bottom portion of at least one support leg traverses a second plane parallel to the first plane when moved between the operational configuration and a storage configuration.

3. The apparatus of claim 1 wherein the multi-directional level indicator comprises a circular float level with a bubble indicator.

4. The apparatus of claim 1, wherein the plurality of support legs comprises three angularly spaced support legs, at least two of the support legs being rotatable mounted to the housing, the two support legs capable of forming a generally coplanar configuration with a third leg.

5. The apparatus of claim 4, wherein the first support leg is pivotally mounted at a first pivot point on the base of the housing and the second support leg is mounted at a second pivot point on the base of the housing.

6. The apparatus of claim 4 wherein the first, second and third legs are spaced equally around the perimeter of the base when in the operational configuration.

7. The apparatus of claim 4, wherein the first support leg includes a first traveling member extending therefrom for traveling in a first radial slot along the base as the first support leg is pivoted between the operational configuration and the storage configuration.

8. The apparatus of claim 7, wherein the second support leg includes a second traveling member that travels in a second radial slot along the base.

9. The apparatus of claim 8, wherein the first and second traveling members provide angular stability to the first and second support legs.

10. The apparatus of claim 1, wherein the plurality of support legs comprises first and second support legs rotatably mounted to the housing and a third support leg rigidly mounted to the housing, the first and second support legs having an operational configuration angularly spaced from a third support leg and a storage configuration such that the first and second support legs are rotatable to a configuration adjacent the third support leg.

11. The apparatus of claim 1, wherein the circular float level includes markings thereon to indicate magnitude of the slope of the plane relative to the surface.

12. The apparatus of claim 11, wherein the markings comprise a plurality of concentric circles.

13. The apparatus of claim 1, wherein the multi-directional level indicator comprises a hollow chamber containing a fluid and a buoyant member.

14. The apparatus of claim 1, wherein the plurality of support legs includes a pair of support legs rotatably mounted to the housing, each of the pair of support legs rotatably mounted at discrete pivot points and including a traveling member extending therefrom and into radial slots in the base of the housing.

15. The apparatus of claim 1 wherein the fixed distance comprises a distance greater than the diameter of a golf ball.

16. An inclination indicating apparatus for indicating the slope of a surface upon which the apparatus is placed, the apparatus comprising:

a housing having a base;

first and second support legs angularly spaced from a third support leg in an operational configuration and rotatably mounted to the housing such that the first and second support legs are rotatable to a storage configuration adjacent the third support leg, the first, second and third support legs for supporting the base of the housing above the surface, the base establishing a plane over the surface, so that the plane is capable of being located above the surface by a fixed distance; and a circular float level mounted on the housing having a bubble indicator for indicating the slope of the plane relative to the surface.

17. The apparatus of claim 16, wherein the first and second support legs are pivotally mounted at first and second pivot points on the base of the housing, respectively.

18. The apparatus of claim 16, wherein the first support leg includes a first traveling member extending therefrom for traveling in a first radial slot along the base as the first support leg is pivoted between the operational configuration and the storage configuration.

19. The apparatus of claim 18, wherein the second support leg includes a second traveling member that travels in a second radial slot along the base.

20. The apparatus of claim 16, wherein the circular float level includes markings thereon to indicate magnitude of the slope of the plane established over the surface.

21. The apparatus of claim 18, wherein the markings include a plurality of concentric circles.

22. An inclination indicating apparatus for indicating the slope of a surface, the inclination indicating apparatus comprising:

a housing having a base defining a first plane;

a plurality of support legs for supporting the base of the housing above the surface in an operational configuration, at least one of the support legs being rotatable so that a bottom portion of the at least one support leg traverses a second plane parallel to the first plane from the operational configuration to a storage configuration, so that the plane is capable of being located above the surface by a fixed distance; and a multi-directional float level mounted on the housing having a bubble indicator for indicating the slope of the first plane relative to the surface when the inclination indicating apparatus is located on the surface in the operational configuration.

23. A method of using an inclination indicating apparatus comprising the steps of:

placing a housing of the inclination indicating apparatus on a surface, the base of the housing defining a first plane;

rotating at least one of a support leg from an storage configuration to a operational configuration so that the first plane of the base is capable of being located above the surface by a fixed distance; and observing a multi-directional float level mounted on the housing to determine the slope of the first plane relative to the surface.

24. The method of claim 23 further including the step of rotating the at least one support leg from the operational configuration to the storage configuration.

* * * * *